April 16, 1929.　　　E. SCHMIDTKE　　　1,709,326

VEHICLE BRAKE

Filed March 15, 1927

INVENTOR.
E. Schmidtke
BY
ATTORNEY.

Patented Apr. 16, 1929.

1,709,326

UNITED STATES PATENT OFFICE.

EMIL SCHMIDTKE, OF COLORADO SPRINGS, COLORADO.

VEHICLE BRAKE.

Application filed March 15, 1927. Serial No. 175,544.

This invention relates to vehicle brakes and its principal object is to provide a simple compensating mechanism by which the four wheels of an automobile or other four wheeled vehicle may be simultaneously and uniformly braked through the movement of a single operating pedal or hand lever.

Further objects of the invention reside in details of construction as will fully appear in the course of the following description.

Figure 1:
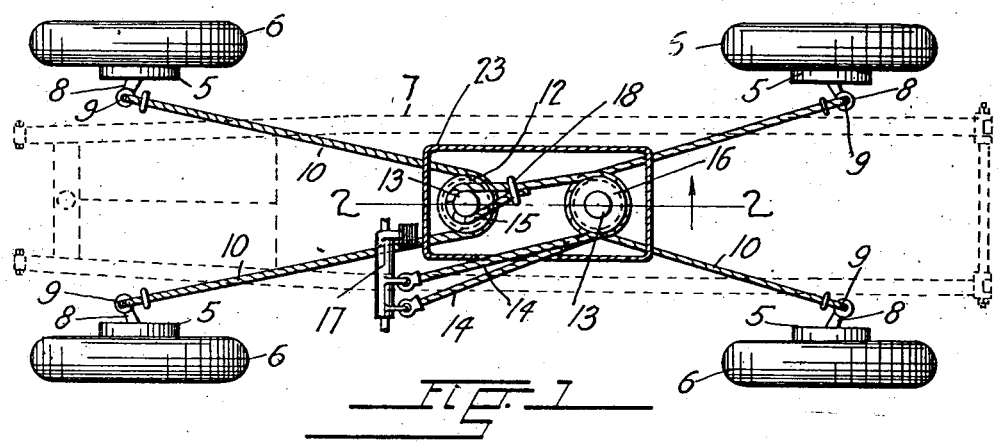
Figure 2:
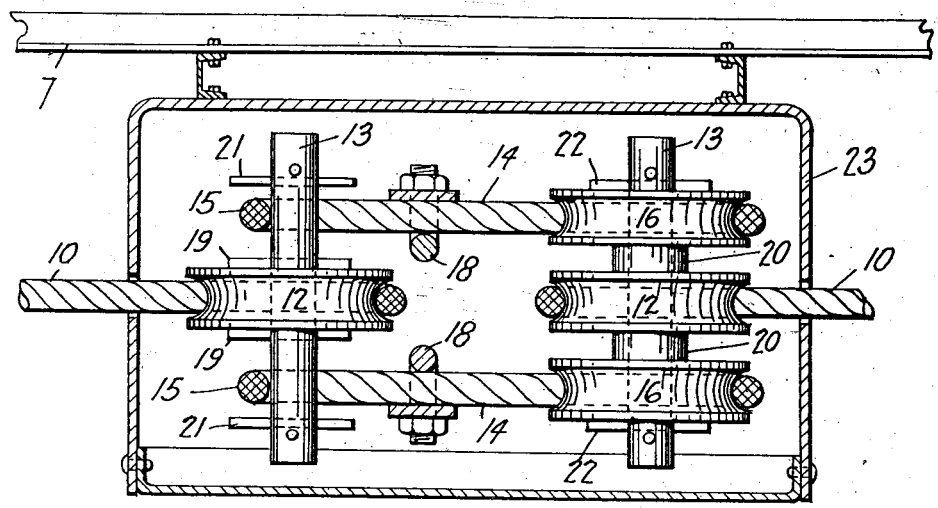
Figure 3:
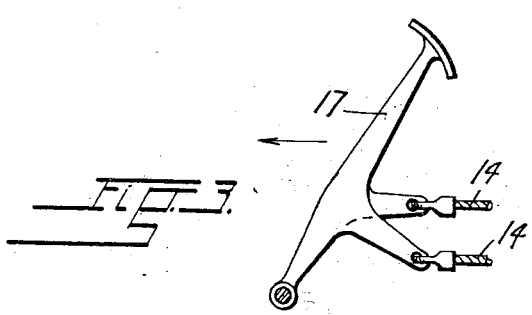

An embodiment of the invention has been illustrated in the accompanying drawings in the three views of which like parts have been similarly designated and in which Figure 1 represents a plan view of the braking system in operative relation to the four wheels of a motor driven vehicle the chassis of which has been shown in broken lines, Figure 2, a section taken on the line 2—2 Figure 1, and drawn to an enlarged scale, and Figure 3, a detail of a foot lever showing the method of its connection in the system.

The internal parts of the brakes 5 associated with the wheels 6 of the vehicle have not been illustrated. The brakes may be of any suitable construction and for the purpose of describing their connection in the system of the present invention, only those members of their operating mechanism to which flexible cables included in the invention may be attached to set the brakes, have been indicated.

The members above referred to have been designated by the numerals 8 and the cables which are attached to the members at 9 by the numerals 10. The two cables pass around sheaves 12 mounted on short shafts 13 which are arranged in substantially parallel relation to each other.

Cables 14 fastened to one of the shafts at opposite sides of its respective sheave 12, by means of loops 15 at one of their ends, pass around sheaves 16 on the other shaft at opposite sides of its sheave 12 and they are fastened at their other ends to an operating lever such as the pedal 17 shown in Figures 1 and 3.

The loops 15 at the ends of the cables may be formed by bending the end portions of the cables upon themselves and fastening the extremities thereof by clevis-clamps 18.

Pins 19 on the shaft to which the cables 14 are attached hold the respective sheave 12 against displacement, collars 20 on the other shaft hold the respective sheaves 12 and 16 in their relative positions, pins 21 on the first mentioned shaft prevent displacement of the loops 15 at the ends of the cables 14, and pins 22 on the other shaft hold the three sheaves against movement lengthwise of the shaft, by engagement with the outer sheaves.

The arrangement of shafts, sheaves and cables is loosely suspended by the cables which are fastened to the operating lever and the brakes, and the floating mechanism may be enclosed in a casing fastened to a convenient part of the vehicle as shown at 23 in the drawings.

In the operation of the system, the movement of the lever in the direction indicated by the arrow in Figure 3 causes the two shafts to be drawn together by means of the cables 14 with the result that the brakes on the four wheels are simultaneously and uniformly set, through the medium of the cables 10.

Having thus described my invention, what I claim and desire to secure by Letters Patent is:—

1. A braking system for four wheel vehicles, comprising two cables connecting operating parts of brakes on opposite wheels of the vehicle, a sheave for each cable, floating shafts for the sheaves, a guide sheave on one of the shafts, an operating lever, and a cable passing around the guide sheave, having at one end a loop embracing the other shaft and connected at the other end with the lever.

2. A braking system for four wheel vehicles, comprising two cables connecting operating parts of brakes on opposite wheels of the vehicle, a sheave for each cable, floating shafts for the sheaves, a guide sheave on one of the shafts, an operating lever, and a cable passing around the guide sheave, the last mentioned cable being fastened at one end to the other shaft and at the other end to the lever.

In testimony whereof I have affixed my signature.

EMIL SCHMIDTKE.